UNITED STATES PATENT OFFICE.

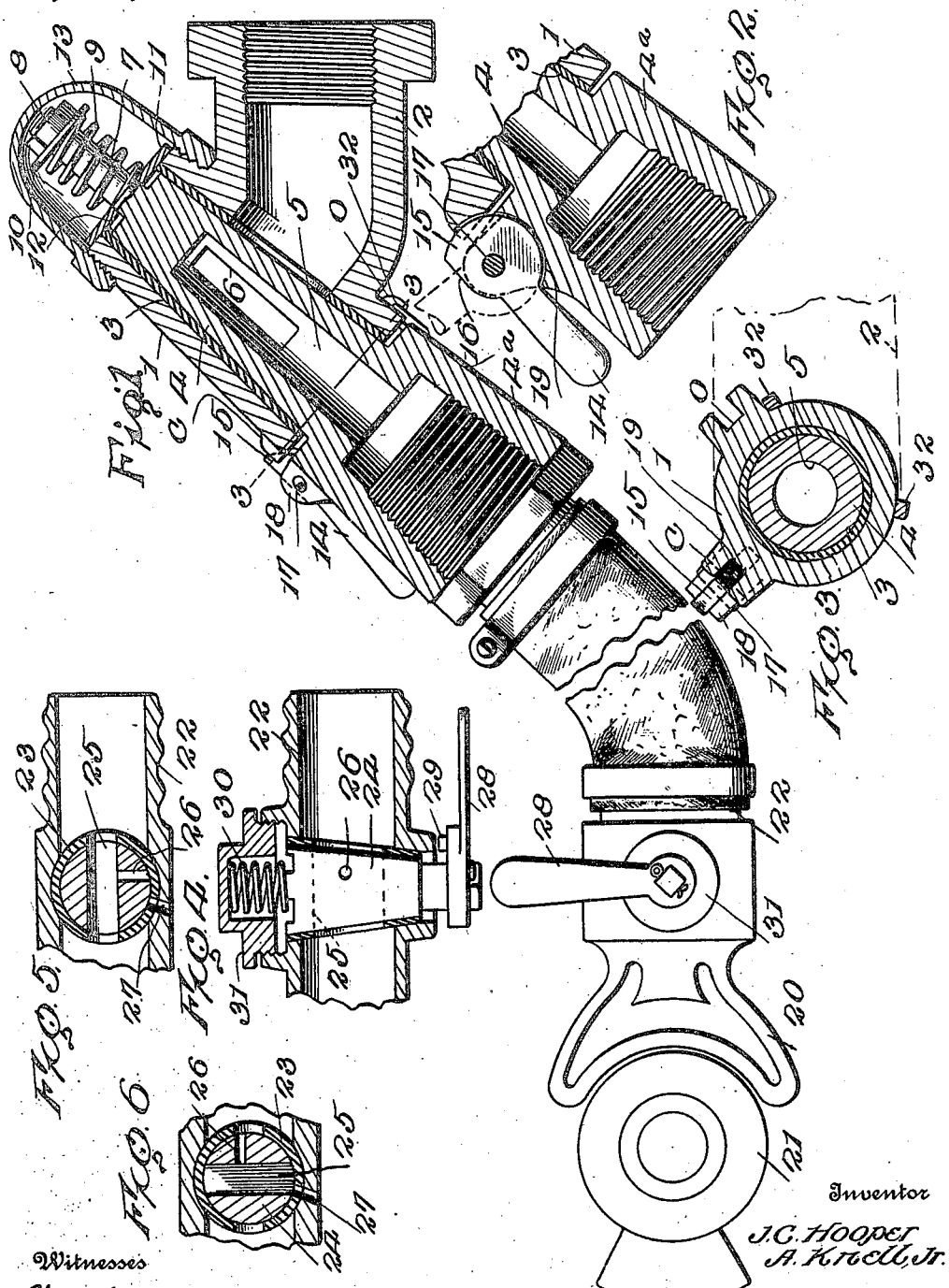

JOHN C. HOOPER AND ANDREW KNELL, JR., OF BALTIMORE, MARYLAND.

HOSE-PIPE COUPLING.

1,295,503. Specification of Letters Patent. Patented Feb. 25, 1919.

Application filed January 12, 1917, Serial No. 142,118. Renewed January 18, 1919. Serial No. 271,888.

*To all whom it may concern:*

Be it known that we, JOHN C. HOOPER and ANDREW KNELL, Jr., citizens of the United States, residing at Baltimore, State of Maryland, have invented certain new and useful Improvements in Hose-Pipe Couplings, of which the following is a specification.

This invention comprehends certain new and useful improvements in fluid pressure brake systems and relates particularly to improved safety appliances for train-pipe hose couplings.

To those versed in the art to which this invention appertains, it is well known that train-men in the act of uncoupling the cars manipulate the car coupling releasing levers after they have turned the angle cocks to closed position without disconnecting the hose pipe couplers, before giving the engineer the signal to go ahead. This manifestly stretches the hose-pipes which results in their permanent injury, owing to the fact that they are thereby split and rendered liable to leak.

The primary object of this invention is to provide, in a device designed to avoid the contingency above mentioned, means whereby the train-man or other operator may easily disconnect the hose-pipe couplers while at the same time of necessity shutting off the angle cocks, the present invention aiming to produce a device of this character in which there is embodied a locking handle which in its open position may be readily grasped to turn the hose-pipe and simultaneously shut off the angle cock, said operating handle combining with the functions just named, the function of a locking device whereby the operator will be sure to leave the angle cock in fully closed position when disconnecting, and in fully open position when desired, the combined operating handle automatically folding to the locked position when released from the grasp of the brakeman.

And the invention has for its further object an improved construction of device for venting the train-pipe prior to the disconnecting of the couplers so as to bring about an application of the brakes before the hose couplers are disconnected whereby the operation of disconnecting the couplers is rendered safe and the accidents which have frequently occurred by the disconnecting of the hose couplers with the train-pipe at standard pressure effectually avoided.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings in which:

Figure 1 is a longitudinal sectional view of our improved safety angle cock, the hose-pipe coupling being shown in elevation;

Fig. 2 is an enlarged sectional view of a portion of the cock;

Fig. 3 is a transverse sectional view thereof on the line 3—3 of Fig. 1;

Fig. 4 is a sectional view of a portion of the coupling; and

Figs. 5 and 6 are detail sections illustrating the vent valve in different positions.

Corresponding and like parts are referred to in the following description and indicated in all the views of the accompanying drawings by the same reference characters.

Referring to the drawing, the numeral 1 designates the body portion of our improved angle cock, the same being formed with the ordinary attaching nipple 2, interiorly threaded as shown, the body portion or barrel 1 being obliquely disposed with reference to the nipple, so that as the nipple 2 is secured to the train-pipe in a substantially horizontal position, the body portion or barrel 1 which communicates with the interior of the nipple, will be held at an inclination to the vertical, preferably at an angle approximating 45°. The barrel 1 contains a preferably brass bushing 3 and both barrel and bushing are tapered from their lower ends to their upper ends, as clearly illustrated in the drawing.

4 designates the plug of the angle cock, said plug being hollow as shown and containing a longitudinally extending opening 5, and one or more ports 6 designed to control the communication between the interior of the nipple 2 and the interior of the plug. The plug 4 is tapered so as to accurately fit the interior of the bushing 3 and is provided at its upper end with a threaded stem 7 on the upper extremity of which a nut 8 is screwed. The spring 9 is coiled around the stem 7 and is interposed between a washer 10 fitted on the stem contiguous to the nut 8, and against another preferably large washer 11 which extends over the upper end of the bushing 3 and preferably into engagement with the upper end of the barrel 1. By this means, the plug will be permanently and surely held to its seat in the bushing and, in the preferred proportion of the parts, a take-up opening 12 is left so that compensation may be made for wear.

Preferably a cap 13 is screwed or otherwise detachably held on the upper end of the barrel 1 and incloses a stem 7, a nut 8 and concomitant parts and prevents them from being interfered with by dirt or the like.

The shoulder portion 4ª of the plug 4 is interiorly threaded for the connection of a hose-pipe thereto and may be hexagonal or otherwise polygonal in cross section so that a tool may be conveniently applied thereto to turn the plug, but a shoulder portion of this character is entirely unnecessary with our construction of device, as it is one of the main objects of our invention to provide positive means, always at hand on the plug whereby the operator may easily turn the latter and open or close the angle cock. This means specifically considered consists of a handle 14 which is provided with a substantially semi-circular head 15 terminating in a preferably straight edge 16, the said head being pivotally mounted as at 17 on a stud secured to and extending between the ears 18 that are formed on the plug 4 at the shouldered end thereof contiguous to the lower end of the barrel 1. In order to accommodate the curved head 15 and permit it to swing from between the ears the plug 4 is formed at the base of the said ears with curved recesses 19 as clearly illustrated in the drawing. In the fully open or closed position, the head 15 of the handle 14 is designed for locking engagement with either one of the two recesses C and C that are formed in proper spaced relation to each other in the lower edge of the case or barrel 1, said recesses denoting the open and closed position of the plug 4. When the plug is turned to either of said positions, it may be easily locked in the required position by dropping the handle so as to permit it to lock itself in the notch or recess. It will then be clear that the operator will have at hand means whereby to positively move the plug to open or closed position without depending upon his hands merely encircling the shouldered portion 4ª of the plug and without depending upon some separate tool to engage such shouldered portion, and that after the plug has thus been positively moved to open or closed position, it may be locked as against accidental movement.

In addition to the above described arrangement and construction of the parts, our invention embodies as set forth in the beginning of the specification, a simple, durable and efficient device whereby the train pipe may be properly vented before closing the angle cocks and disconnecting the hose-pipe couplers. Referring now particularly to Figs. 1, 4, 5 and 6 for a description of this part of the device 20 designates one of our improved hose-pipe couplers which may be provided with any of the conventional or desired forms of jaws 21 and shanks 22, the latter being designated for connection in the ordinary manner and in the present embodiment of the invention the hose-pipe connection or shank 22 is set off from the jaw portion and between the two, the coupler embodies a valve casing which includes a tapered bushing 23 and a correspondingly formed plug 24, the plug being provided with a straight-way port or passage 25 and a lateral vent port 26 communicating therewith, the valve casing and bushing being also provided with apertures forming a corresponding port 27 leading to the atmosphere. To the lower end of the plug 4, a handle 28 is secured, the handle being provided with the usual stop lug 29 designed for limited movement within a recess formed in the valve casing. The large end of the plug is engaged by an expansion spring 30 which is housed within a screw-cap 31, said screw-cap being secured to the valve casing as clearly illustrated in the drawing. When the plug 4 is in the open position illustrated in Fig. 5 the leakage groove or port 26 is out of registry with the corresponding vent port 27 and when the plug 24 is turned to the closed position illustrated in Fig. 6, the straight-way port 25 will establish communication between the vent portion 26 and 27 and a leakage passage will thus be provided from the hose-pipe to the atmosphere. It will thus be seen, that we have here provided an additional means of safety, which will prevent if properly used, those occurrences which have resulted sometimes in serious injuries to the train-man while attempting to uncouple the hose-pipes with the train-pipes at standard pressure, thereby securing an emergency application to the brakes and receiving the full force of air into the flexible hose-pipe and the relatively heavy metal couplers on the free ends thereof.

As best seen in Fig. 3, the stop lugs 32 are provided so as to limit the movement of the turn-plug of the angle-cock.

Having thus described the invention, what is claimed as new is:

1. An angle cock embodying a casing or barrel, a plug mounted to turn in said barrel for controlling the passage therethrough, the plug projecting out of the casing at one end and formed at such end for connection of a hose pipe thereto, and a handle carried by one of said parts and arranged for locking engagement with the other whereby to lock said plug in open and closed position.

2. An angle cock, embodying a casing, and a plug mounted to turn in said casing and controlling the passage therethrough, the plug projecting out of the casing at one end and formed at such end for the connection of a hose-pipe thereto, and a locking handle pivotally connected to the projecting end of the plug and designed for engagement with the casing whereby to lock the plug in open or closed position.

3. An angle cock, embodying a barrel, a plug mounted to turn in said barrel and controlling the passage therethrough, the plug projecting out of the lower end of the barrel and formed at its projecting portion for the connection of a hose-pipe and a locking handle pivotally connected to the projecting portion of the plug and designed for engagement with the adjacent edge of the barrel whereby to lock the plug in open or closed position.

4. An angle cock embodying a barrel formed in its lower edge with spaced notches, a plug mounted to turn in said barrel and controlling the passage therethrough, the plug projecting at one end out of the lower end of the barrel and formed at such end for the connection of a hose-pipe thereto, and a locking handle pivotally connected to the projecting end of the plug and designed for engagement in either of said notches for the purpose specified.

5. An angle cock embodying a barrel, a plug mounted to turn in said barrel and controlling the passage therethrough, the plug projecting at one end out of the lower end of the barrel and formed at such end for the connection of a hose-pipe thereto, and a locking handle pivotally mounted on the projecting end of the plug and provided with a curved head designed for engagement with the lower edge of the barrel whereby to hold the plug in open or closed position.

In testimony whereof we affix our signatures.

JOHN C. HOOPER.
ANDREW KNELL, Jr.